2,714,100

DIALLYL MONOCHLOROMETHANEPHOSPHONATE AND POLYMERS

Arthur Dock Fon Toy, Park Forest, and Kenneth H. Rattenbury, Chicago Heights, Ill., assignors to Victor Chemical Works, a corporation of Illinois No Drawing. Application August 5, 1952,
Serial No. 302,835

4 Claims. (Cl. 260—80)

This invention relates to a new unsaturated phosphonate ester of chloromethane phosphonic acid and to polymers thereof. This new ester may be represented by the following formula:

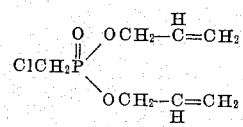

The new ester compound may be produced by reacting chloromethane phosphorus oxydichloride with allyl alcohol under suitable reacting conditions.

The chloromethane phosphorus oxydichloride may be made by the known method of reacting phosphorus trichloride and formaldehyde under suitable conditions of temperature and pressure. This reaction may be expressed by the following equation:

$$PCl_3 + HCHO \rightarrow ClCH_2POCl_2$$

The ester monomer of the present invention is a clear liquid with an index of refraction $N_D^{25} = 1.4674$ and a specific gravity of $1.1902^{25}$. It is suitable as a plasticizer and modifying agent for a number of commercial resins and plastics. It imparts fireproofing characteristics to such resin products and in addition may be used when polymerized to impart unusual flame resistance to various fabrics. In this respect, this ester is unique in that a single simple treatment of a fabric will render it flame resistant even after repeated washings. It may also be employed as an organic solvent and under certain conditions it may be polymerized to give satisfactory clear resin products which are flame resistant. The flameproofing of fabrics with these materials is disclosed and claimed in the copending application of James R. Costello, Serial No. 302,823, filed August 5, 1952.

The new diallyl chloromethanephosphonate may be prepared by reacting allyl alcohol with chloromethane phosphorus oxydichloride in the presence of tertiary amines such as pyridine and triethyl amine with or without an inert solvent such as benzene, hexane, etc.

The polymerized products of the present invention include products of varying degrees of polymerization, the products ranging from viscous oils to solid, clear resins and having various utilities including those of solvents, plasticizing and resin modifying agents, coating agents, and finished solid resin products. Of special importance is a free-flowing, white, precipitated prepolymer which may be used as a molding powder having commercial value.

The polymerizing conditions and procedures employed in producing the polymers of this invention vary over a wide range from simply heating the liquid monomers for extended periods to controlled heating of the monomers mixed with varying amounts of polymerization catalysts such as benzoyl peroxide, acetyl peroxide, oxygen, air, hydrogen peroxide, and the like at various temperatures and for different periods of time. The type of catalyst employed has a distinct effect on the character of the resulting polymerized product. For example, in the presence of oxygen or air, the polymerization proceeds forming relatively soft solid resins. With the use of benzoyl peroxide, the polymerization can be made to proceed at such a rate that hard, solid resins may be obtained. Generally, when the hard solid type resin is desired, it is advisable to carry out the polymerization in an inert atmosphere, for example, in the presence of nitrogen, carbon dioxide, etc. The resins are of the thermosetting type and may be employed advantageously in a monomeric or partially polymerized state for impregnating glass and textile fibers and then completing the polymerization to form hard strong laminates of high commercial value.

The reaction involved in producing the new ester may be illustrated by the following equation:

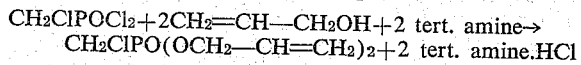

The following examples illustrate the production of the new ester and methods for producing polymers and prepolymer molding powders therefrom:

Example 1

In a three necked 500 ml. flask equipped with stirrer, thermometer and dropping funnel were placed 250 ml. of benzene, 85 gm. (0.8 mole) of triethylamine and 48.7 gm. (0.8 mole plus 5% excess) of allyl alcohol. The contents of the flask were then cooled to 0° C. 67 gm. (0.4 mole) of chloromethane phosphorus oxydichloride was then added through the dropping funnel over a period of 1¼ hours controlling the temperature within 5° of 0° C. The resulting slurry was stirred for 45 minutes in the ice bath. To this slurry was added 250 ml. of ice water to dissolve the amine hydrochloride precipitate. The solution was then transferred to a separatory funnel where the aqueous layer was separated. The benzene solution of the product was then given successive washes with 125 ml. portions of a cold 5% sodium bicarbonate solution and a cold 5% sodium chloride solution. The product solution was transferred to a 500 ml. distilling flask and a small amount of copper resinate was added to inhibit polymerization. The benzene and traces of water were removed by distilling at 50° C. under reduced pressure. The residual material was transferred to a 200 ml. distilling flask and evacuated to less than 1 mm. of pressure. The solution was then distilled collecting the product at a vapor temperature of 94–98° C. 65.5 gm. of product was collected which was then redistilled under the same conditions collecting 63.4 gms. of redistilled product. This material, diallyl chloromethane phosphonate, analyzed 14.6% phosphorus and 17.2% chloride (theory 14.6% P, 16.9% Cl) and had an index of refraction $N_D^{25} = 1.4674$.

Example 2

Two five gram samples of the diallyl chloromethane phosphonate prepared in Example 1 were placed in small glass stoppered bottles. Two and three per cent respectively of benzoyl peroxide were added to the two samples. All air was flushed from the bottles with a stream of dry nitrogen gas after which they were tightly stoppered. Both bottles were placed in an oil bath regulated at 85° C. and let stand overnight. Each sample produced a clear hard resin, although the sample containing two per cent benzoyl peroxide was slightly softer on the top surface. Both samples burned when held directly in a flame, but were self extinguishing when removed.

Example 3

In a two liter three necked flask equipped with stirrer, thermometer and two dropping funnels were placed 494 gm. of toluene and 230 gm. (3.98 mols) of allyl alcohol. The mixture was then cooled below −5° C. and 350 gm. (3.45 mols) triethylamine and 267.8 gm. (1.6 mols) of chloromethane phosphorus oxydichloride were added simultaneously while maintaining the temperature at −10 to −5° C. The triethylamine was all added in 7½ hours while the chloromethane phosphorus oxydichloride was added in approximately seven hours. The mixture was stirred overnight in an ice bath and then filtered washing the triethylamine hydrochloride filter cake with 500 ml. of toluene. The dry filter cake weighed 469.3 gm. (100%). The filtrate was washed successively with 100 ml. portions of a 10% brine solution and a 10% sodium bicarbonate solution. The product solution was separated and transferred to a distilling flask where the toluene and traces of water were removed by distilling at 30° C. under reduced pressure. The pressure was further reduced to 3 mm. at room temperature giving 327 gm. (97%) of undistilled product having an index of refraction $N_D^{25}=1.4687$. 100 gm. of this product was redistilled at a pressure of 1 mm. collecting the fraction distilling at a vapor temperature of 93–107° C. 92.2 gm. of product were recovered having an index of refraction $N_D^{25}=1.4677$. The overall distilled yield was thus 89%. Using the polymerization procedure described in Example 2 using 2% benzoyl peroxide, a sample of this product produced a hard, clear solid.

*Example 4*

Diallyl chloromethane phosphonate was copolymerized with diallyl phthalate and Laminac 4201, an unsaturated polyester-type partial polymer produced by American Cyanamid Company, using ten per cent of the phosphonate ester as follows. Nine grams of diallyl phthalate, one gram of diallyl chloromethane phosphonate and three per cent benzoyl peroxide, based on the combined weight, were mixed in a small glass stoppered bottle. Nine grams of Laminac 4201, one gram of diallyl chloromethane phosphonate and one per cent benzoyl peroxide were similarly treated. Each sample was polymerized according to the procedure followed in Example 2. The copolymers produced were hard yellow solids which were self extinguishing when removed from a flame. This illustrates the unusual flameproofing capacity of the product of this invention.

*Example 5*

Fifty grams of diallyl chloromethane phosphonate and fifty grams of Chlorex (B,B′ dichloroethyl ether), were placed in a flask equipped with agitator and thermometer. The solution was heated to 100° C. under a nitrogen atmosphere and the viscosity determined. One gram of benzoyl peroxide was added and the solution was held at 100° C. with stirring until the viscosity was approximately three times the initial value after which the solution was cooled to room temperature. The resulting prepolymer solution was poured into 1500 ml. of hexane which served to separate the soluble remaining monomer from the insoluble polymer. The insoluble precipitate was washed with more hexane to completely remove all monomer present. A white, free-flowing powder resulted in this material was air dried, which was an excellent thermosetting molding powder. A further use for this powder is illustrated in the following example.

*Example 6*

The unusual characteristic of this new ester as the principal agent in a textile flameproofing process is illustrated here only to emphasize the unique properties.

Twenty grams of the white powder produced in Example 5 were dissolved in 80 ml. of a 30/70 methanol/ethylene chloride solution. A 20 by 2½ inch strip of muslin was then immersed in this solution for five minutes, wrung out and cured at 100° C. for one half hour. The cloth was cut in half and tested according to the vertical flame resistance test described in the Supplement to Federal Specifications for Textiles; General Specifications, Test Methods, CCC–T–19/a. One half gave a burning time of 8.6 seconds and a narrow char length of 5¼ inches. The other half was washed for 15 minutes at 140° F. in a Launderometer using 200 ml. of a 0.5% soap solution. After drying the burning time was 11 seconds with a char length of four inches.

As has been seen, the diallyl chloromethanephosphonate readily polymerizes with itself or copolymerizes with other polymerizing materials such as unsaturated alkyd resins, beta, gamma unsaturated alkenyl esters of dicarboxylic acids, methyl methacrylates, and the like. The partial polymer may also be brominated to produce a new flameproofing compound. In brominating the material, it appears that the bromine satisfies some of the valances at the double bonds of the allyl radicals. It is important, particularly for flameproofing, that not all of the double bonds be satisfied. Apparently, when applied to fabric and cured, there is additional polymerization with the effect of linking the molecules about the fibers of the fabric. In this way, they are held so that they are not removed by washing. On the other hand, if the compounds were saturated by bromination, the resulting product is readily washed out.

The brominated material and methods of flame-proofing therewith are disclosed and claimed in our copending application, Serial No. 302,836, filed August 5, 1952.

The foregoing detailed description has been given for clearness of understanding only and no unnecessary limitations should be understood therefrom as modifications will be obvious to those skilled in the art.

We claim:

1. The new compound: diallyl monochloromethanephosphonate.

2. A homopolymer of diallyl monochloromethanephosphonate.

3. A partial polymer of diallyl monochloromethanephosphonate.

4. A free-flowing, powdered, partial polymer of diallyl monochloromethanephosphonate.

References Cited in the file of this patent

UNITED STATES PATENTS

| | | |
|---|---|---|
| 2,425,765 | Toy | Aug. 19, 1947 |
| 2,425,766 | Toy et al. | Aug. 19, 1947 |
| 2,573,568 | Harman et al. | Oct. 30, 1951 |
| 2,601,520 | Harman et al. | June 24, 1952 |

OTHER REFERENCES

Kabachnik et al., cited in Chem. Abstracts; vol. 45, page 8444, October 1951.